(12) United States Patent
Chun et al.

(10) Patent No.: US 11,327,537 B2
(45) Date of Patent: May 10, 2022

(54) ELECTRONIC DEVICE INCLUDING DISPLAY HAVING HOLES FOR SENSORS

(71) Applicant: Samsung Electronics Co., Ltd., Gyeonggi-do (KR)

(72) Inventors: Woosung Chun, Gyeonggi-do (KR); Dongil Son, Gyeonggi-do (KR); Hyunwoo Sim, Gyeonggi-do (KR); Seungbum Choi, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 16/776,708

(22) Filed: Jan. 30, 2020

(65) Prior Publication Data

US 2020/0249731 A1 Aug. 6, 2020

(30) Foreign Application Priority Data

Feb. 1, 2019 (KR) .......................... 10-2019-0013987

(51) Int. Cl.
*G06F 1/16* (2006.01)
*G09G 3/32* (2016.01)

(52) U.S. Cl.
CPC .......... *G06F 1/1686* (2013.01); *G06F 1/1626* (2013.01); *G09G 3/32* (2013.01); *G09G 2310/0275* (2013.01)

(58) Field of Classification Search
CPC .................................................... G06F 1/1686
USPC ......................................................... 345/204
See application file for complete search history.

(56) References Cited

U.S. PATENT DOCUMENTS

| 9,628,677 | B2 | 4/2017 | Wang et al. |
| 10,094,963 | B2 | 10/2018 | Giachino et al. |
| 10,291,756 | B2 | 5/2019 | Zhang |
| 2014/0160348 | A1 | 6/2014 | Wang et al. |
| 2018/0067245 | A1 | 3/2018 | Giachino et al. |
| 2018/0209616 | A1* | 7/2018 | Lee .......................... F21V 29/70 |

(Continued)

FOREIGN PATENT DOCUMENTS

| KR | 10-1528416 B1 | 6/2015 |
| KR | 10-2017-0113066 A | 10/2017 |

(Continued)

OTHER PUBLICATIONS

International Search Report dated May 18, 2020.

*Primary Examiner* — Long D Pham
(74) *Attorney, Agent, or Firm* — Cha & Reiter, LLC

(57) ABSTRACT

An electronic device is disclosed, including: a printed circuit board, a first support member including a first surface and a second surface opposite to the first surface, the first support member defining a first hole formed through the first surface and the second surface, wherein the printed circuit board is coupled to the second surface, and a display coupled to the first surface of the first support member, the display defining: a second hole on a first side of the display to correspond to at least a portion of the first hole, and a third hole on a second side of the display opposite the first side, the third hole adjacent to the second hole and corresponding to the remaining portion of the first hole, wherein signal lines related to driving pixels of the display are disposed in an area between the second hole and the third hole, and wherein at least a partial area of the display is set as an active area configured to display a screen.

18 Claims, 14 Drawing Sheets

(56) References Cited

U.S. PATENT DOCUMENTS

| | | | |
|---|---|---|---|
| 2018/0233113 A1* | 8/2018 | Zhou | G01S 17/88 |
| 2018/0262602 A1 | 9/2018 | Zhang | |
| 2018/0364869 A1* | 12/2018 | Lee | G06F 3/0421 |
| 2019/0130822 A1 | 5/2019 | Jung et al. | |
| 2019/0165452 A1* | 5/2019 | Jeon | H01Q 1/243 |
| 2019/0227361 A1* | 7/2019 | Yueh | H01L 51/52 |
| 2019/0230204 A1 | 7/2019 | Zhang | |
| 2019/0320253 A1 | 10/2019 | Park et al. | |
| 2019/0325188 A1 | 10/2019 | Jo et al. | |
| 2020/0007669 A1 | 1/2020 | Kwon | |
| 2020/0220959 A1 | 7/2020 | Park et al. | |
| 2020/0221065 A1* | 7/2020 | Chen | H04N 13/239 |

FOREIGN PATENT DOCUMENTS

| | | |
|---|---|---|
| KR | 10-2019-0121155 A | 10/2019 |
| KR | 10-2020-0086034 A | 7/2020 |
| WO | 2018/088726 A1 | 5/2018 |
| WO | 2018/169102 A1 | 9/2018 |

* cited by examiner

ELECTRONIC DEVICE INCLUDING DISPLAY HAVING HOLES FOR SENSORS

CROSS-REFERENCE TO RELATED APPLICATION(S)

This application is based on and claims priority under 35 U.S.C. § 119 to Korean Patent Application No. 10-2019-0013987, filed on Feb. 1, 2019, in the Korean Intellectual Property Office, the disclosure of which is incorporated by reference herein its entirety.

BACKGROUND

1. Field

The disclosure relates to an electronic device including a display.

2. Description of Related Art

Modern portable electronic devices have advanced in technology. Smart electronic devices, such as smartphones, often come equipped with a plurality of sensors, such as a camera/image sensor, a proximity sensor, and other such sensors. For example, the electronic device may capture images using the camera. In another example, the electronic device may detect nearness of a user using the proximity sensor. When the proximity of the user to the electronic device is detected, the electronic device may execute one or more functions, such as deactivating a touch screen display to prevent an erroneous input or a malfunction.

The above information is presented as background information only to assist with an understanding of the disclosure. No determination has been made, and no assertion is made, as to whether any of the above might be applicable as prior art with regard to the disclosure.

SUMMARY

Due to increasing demand for larger displays, the displays on portable electronic devices may occupy a substantial portion or an entirety of the front surface of the electronic device.

Because of the larger display, the sensors are often disposed below the display itself. In this case, the displays may be configured such that light can pass through the display as to be detected by the sensors. However, oftentimes light generated by the sensors may be distorted or attenuated by the various signal lines of the display, and therefore sensor sensitivity may be impaired.

In a configuration in which the sensors are disposed below the display, holes for the sensors may be formed in the display. In addition, in a configuration where the number of sensors is increased, the number of holes formed in the display may be increased. With the increase in the number of holes, the actual available display area of the display is reduced. Further, this can lead to abnormalities in a dust-proofing function of the display or the device.

Aspects of the disclosure are to address at least the above-mentioned problems and/or disadvantages and to provide at least the advantages described below. Accordingly, an aspect of the disclosure is to provide an electronic device including a display.

In accordance with an aspect of the disclosure, an electronic device includes a printed circuit board, a first support member including a first surface and a second surface opposite to the first surface, the first support member defining a first hole formed through the first surface and the second surface, wherein the printed circuit board is coupled to the second surface, a display coupled to the first surface of the first support member, the display defining: a second hole on a first side of the display to correspond to at least a portion of the first hole, a third hole on a second side of the display opposite the first side, the third hole adjacent to the second hole and corresponding to the remaining portion of the first hole, wherein signal lines related to driving pixels of the display are disposed in an area between the second hole and the third hole, and wherein at least a partial area of the display is set as an active area configured to display a screen.

In accordance with another aspect of the disclosure, an electronic device includes a housing including a front plate facing a first direction, a back plate facing a second direction opposite to the first direction, and a side member surrounding a space defined between the front plate and the back plate, a display visible through at least a portion of the front plate, the display including a first edge of a first length, a second edge of a second length greater than the first length, a third edge parallel to the first edge, and a fourth edge parallel to the second edge, wherein the display includes: a plurality of data lines extending between the first edge and the third edge so as to be substantially parallel to the second edge, a first opening formed adjacent to the first edge, and a second opening formed to be spaced apart from the first edge, the second opening aligned with the first opening so as to be substantially parallel to the first edge, wherein a first set of data lines from among the plurality of data lines are disposed in a first area between the first opening and the second opening, a support member disposed between the display and the back plate, at least one image sensor coupled to the support member and directed in the first direction through the first opening, and at least one second image or optical sensor coupled to the support member and directed in the first direction through the second opening.

Other aspects, advantages, and salient features of the disclosure will become apparent to those skilled in the art from the following detailed description, which, taken in conjunction with the annexed drawings, discloses certain embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a sectional view taken along line A-A' of FIG. 2A;

FIG. 7 is a sectional view taken along line B-B' of FIG. 6.

With regard to the description of the drawings, similar reference numerals may be used to refer to similar or related components.

DETAILED DESCRIPTION

Figure 1:
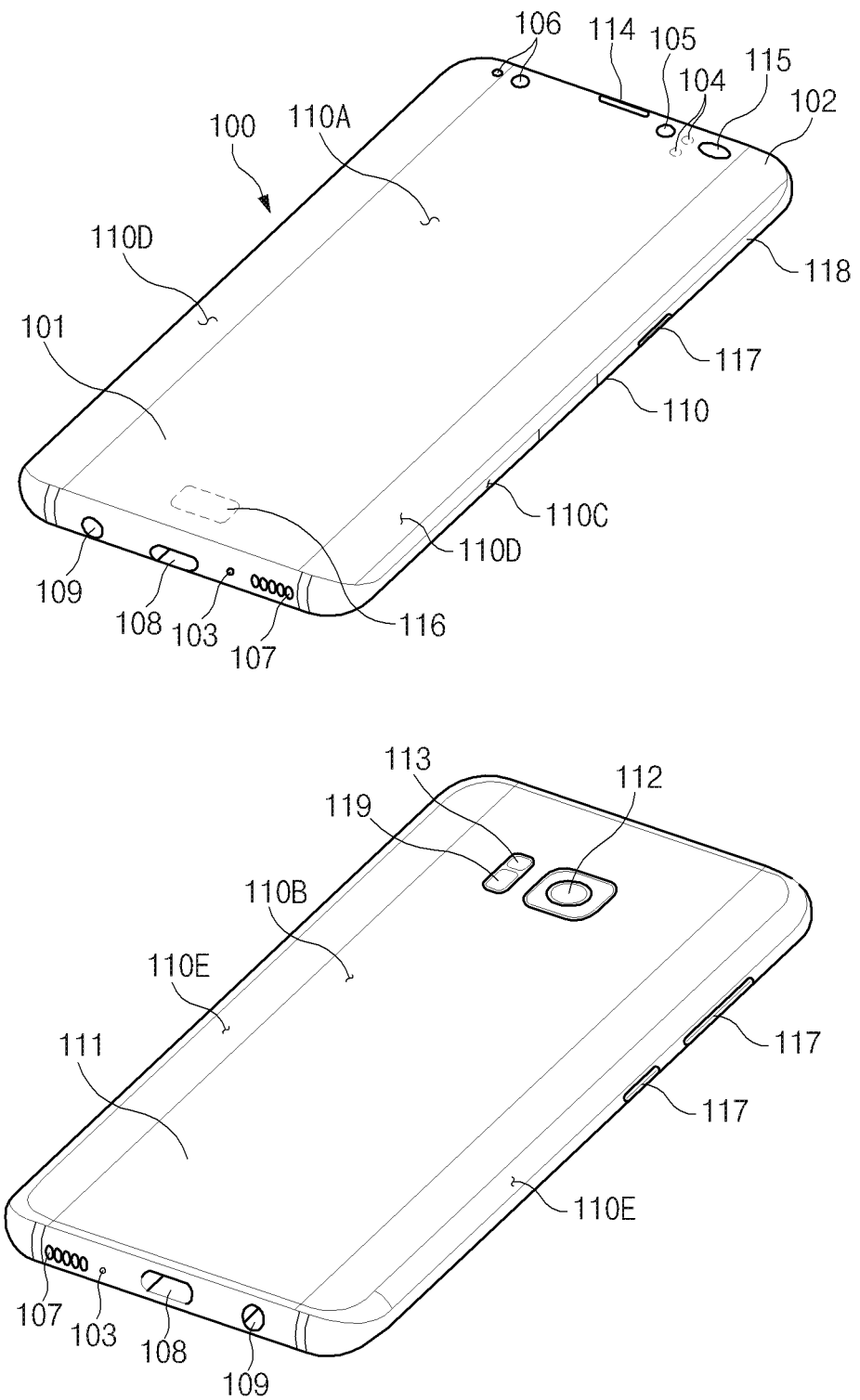
FIG. 1 is a view illustrating front and rear sides of an electronic device according to an embodiment.

FIG. 1 is a view illustrating front and rear sides of an electronic device according to an embodiment.

Referring to FIG. 1, the electronic device 100, according to an embodiment, may include a housing 110 that includes a first surface (or a front surface) 110A, a second surface (or a rear surface) 110B, and side surfaces 110C that surround the space define between the first surface 110A and the second surface 110B. A housing 110 according to another embodiment (that is not illustrated) may refer to a structure that forms at some portions of the first surface 110A, the second surface 110B, and the side surfaces 110C of FIG. 1. According to an embodiment, the first surface 110A may be formed of a front plate 102, at least a portion of which is substantially transparent (e.g., a glass plate or a polymer plate that includes various coating layers). The second surface 110B may be formed by a back plate 111 that is substantially opaque. The back plate 111 may be formed of, for example, a material such as coated or colored glass, ceramic, a polymer, metal (e.g., aluminum, stainless steel (STS), or magnesium), or a combination of at least two thereof. The side surfaces 110C may be formed by a side bezel structure (or a "side member") 118 that is coupled with the front plate 102 and the back plate 111 and that contains metal and/or a polymer. In some embodiments, the back plate 111 and the side bezel structure 118 may be integrated with each other and may contain or be implemented using the same material (e.g., a metallic material such as aluminum).

In the illustrated embodiment, the front plate 102 may include, at opposite long edges thereof, two first areas 110D that curvedly and seamlessly extend towards the back plate 111 from the first surface 110A. In the illustrated embodiment, the back plate 111 may include, at opposite long edges thereof, two second areas 110E that curvedly and seamlessly extend towards the front plate 102 from the second surface 110B. In some embodiments, the front plate 102 (or the back plate 111) may include only one of the first areas 110D (or the second areas 110E). In another embodiment, a part of the first areas 110D or the second areas 110E may not be included. In the embodiments, when viewed from a side of the electronic device 100, the side bezel structure 118 may have a first thickness (or width) at sides, not including the first areas 110D or the second areas 110E, and may have a second thickness smaller than the first thickness at sides including the first areas 110D or the second areas 110E.

According to an embodiment, the electronic device 100 may include at least one of a display 101, audio modules 103, 107, and 114, sensor modules 104, 116, and 119, camera modules 105, 112, 113, and 115, key input devices 117, light emitting elements 106, and connector holes 108 and 109. In some embodiments, the electronic device 100 may omit at least one or more of the listed components (e.g., the key input devices 117 or the light emitting elements 106) from among the aforementioned components, or may additionally include other component(s) not listed above.

The display 101, for example, may be visible and/or exposed through a large portion of the front plate 102. In some embodiments, at least a portion of the display 101 may be visible and/or exposed through the front plate 102 that forms the first surface 110A and the first areas 110D of the side surfaces 110C. In some embodiments, the periphery of the display 101 may be formed to have a shape substantially matching the shape of the adjacent periphery of the front plate 102. In another embodiment, the gap between the periphery of the display 101 and the periphery of the front plate 102 may be substantially constant across a span of the gap, to expand the area by which the display 101 is exposed.

In an embodiment, recesses or openings may be formed in a screen display area of the display 101, and the electronic device 100 may include at least one of the light emitting elements 106, the audio module 114, the sensor module 104, and the camera modules 105 and 115. The elements and modules 106, 114, 104, 105, 115, etc. may then be disposed as to be aligned with the recesses or the openings. Furthermore, in an embodiment, the fingerprint sensor 116 may be included in a portion of the screen display area of the display 101. In another embodiment (not illustrated), the electronic device 100 may include, on a rear surface of the screen display area of the display 101, at least one of the audio module 114, the sensor modules 104, the camera modules 105 and 115, and the light emitting elements 106. In another embodiment (not illustrated), the display 101 may be coupled with, or disposed adjacent to, touch detection circuitry, a pressure sensor for measuring the intensity (pressure) of a touch, and/or a digitizer for detecting a stylus pen of a magnetic type. In some embodiments, at least a part of the sensor modules 104 and 119 and/or at least a part of the key input devices 117 may be disposed in the first areas 110D and/or the second areas 110E.

The audio modules 103, 107, and 114 may include the microphone hole and the speaker holes, as depicted. A microphone for obtaining a sound from the outside may be disposed in the microphone hole 103, and in some embodiments, a plurality of microphones may be disposed in the microphone hole 103 to detect the direction of a sound. The speaker holes may include the external speaker hole and the receiver hole for a telephone call. In some embodiments, the speaker holes and the microphone hole may be implemented with one hole, and a speaker (e.g., a piezoelectric speaker) may be included without the speaker holes.

The sensor modules 104, 116, and 119 may generate an electrical signal or a data value that corresponds to an operational state of the electronic device 100 or an environmental state external to the electronic device 100 by detection using one of the included sensors. The sensor modules 104, 116, and 119 may include, for example, the first sensor module 104 (e.g., a proximity sensor) and/or the second sensor module (not illustrated) (e.g., a fingerprint sensor) that is disposed on the first surface 110A of the housing 110, and/or the third sensor module 119 (e.g., an HRM sensor) and/or the fourth sensor module 116 (e.g., a fingerprint sensor) that is disposed on the second surface 110B of the housing 110. According to an embodiment, at least a part of the first sensor module 104 may be disposed between the camera modules 105 and 115. The fingerprint sensor may be disposed not only on the first surface 110A of the housing 110 (e.g., the display 101) but also on the second surface 110B. The electronic device 100 may further include a non-illustrated sensor module, which may be, for example, at least one of a gesture sensor, a gyro sensor, an atmospheric pressure sensor, a magnetic sensor, an acceleration sensor, a grip sensor, a color sensor, an infrared (IR) sensor, a biometric sensor, a temperature sensor, a humidity sensor, or the illuminance sensor (e.g., the sensor modules 104).

The camera modules 105, 112, 113, and 115 may include the first camera device 105 disposed on the first surface 110A of the electronic device 100, the second camera device 115 disposed on the first surface 110A so as to be adjacent to the first camera device 105, and the third camera device 112 and/or the flash 113 disposed on the second surface 110B. The camera devices 105, 112, and 115 may include one or more lenses, one or more image sensors, image signal processors, and/or a transmitter and a receiver of a light source. The flash 113 may include, for example, a light emitting diode or a xenon lamp. In some embodiments, two or more lenses (an IR camera lens, a wide angle lens, and a telephoto lens) and image sensors may be disposed on one surface of the electronic device 100.

The key input devices 117 may be disposed on the side surfaces 110C of the housing 110. In another embodiment, the electronic device 100 may not include all or some of the aforementioned key input devices 117, and the key input devices 117 not included may be implemented with different forms of input devices such as soft keys on the display 101. In some embodiments, the key input devices 117 may include the sensor module 116 disposed on the second surface 110B of the housing 110.

The light emitting elements 106 may be disposed on, for example, the first surface 110A of the housing 110. The light emitting elements 106 may provide, for example, state information of the electronic device 100 in the form of light. In another embodiment, the light emitting elements 106 may provide, for example, a light source that operates in conjunction with the camera module 105. The light emitting elements 106 may include, for example, an LED, an IR LED, and a xenon lamp.

The connector holes 108 and 109 may include the first connector hole 108 in which to receive a connector (e.g., a USB connector) for transmitting and receiving power and/or data with an external electronic device, and/or the second connector hole 109 in which to receive a connector (e.g., an earphone jack) for transmitting and receiving audio signals with an external electronic device.

Figure 2A:
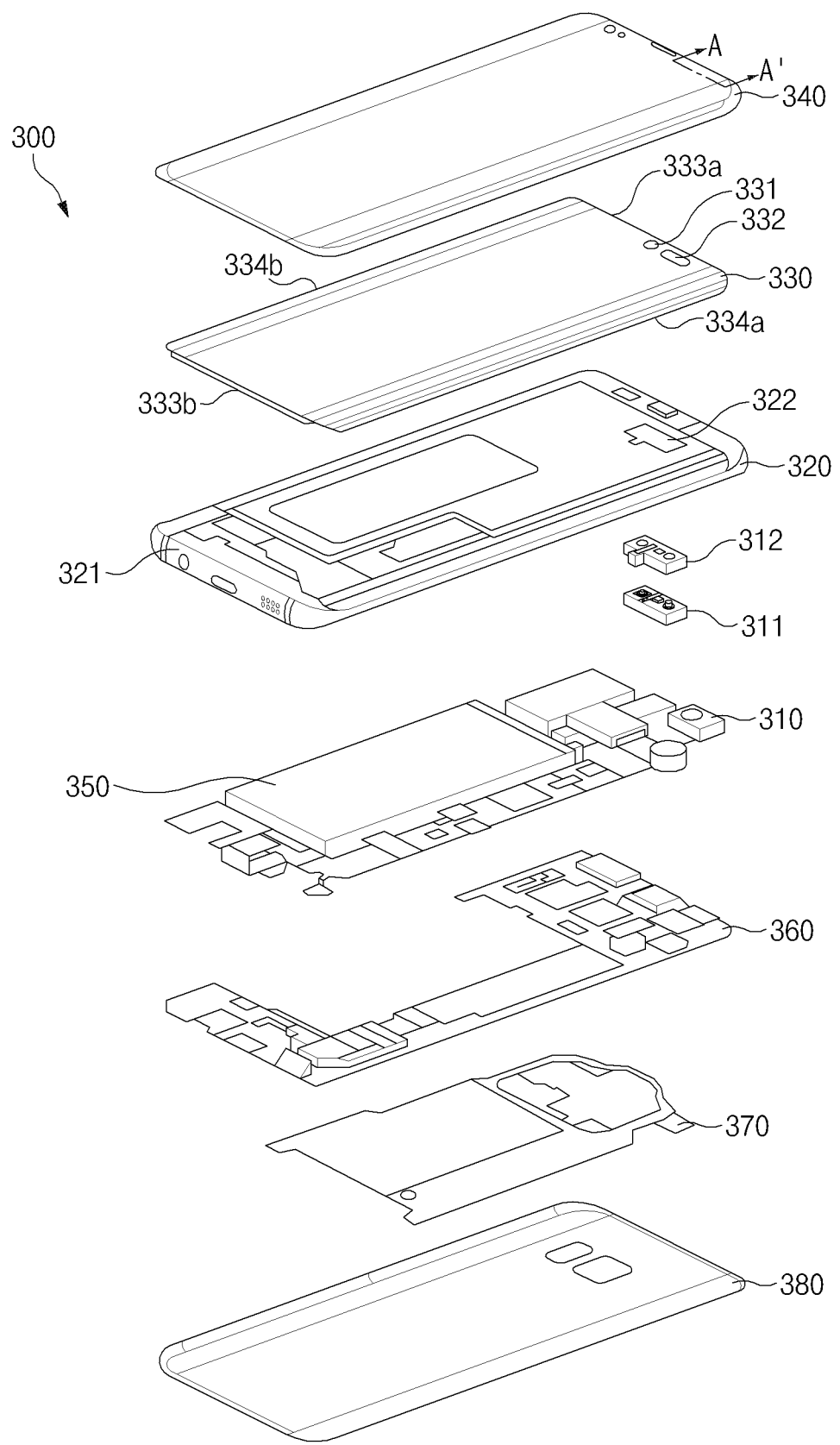
FIG. 2A is an exploded perspective view illustrating an electronic device according to a first embodiment.

FIG. 2A is an exploded perspective view illustrating an electronic device according to a first embodiment.

Referring to FIG. 2A, the electronic device 300 may include a printed circuit board 310, a first support member 320 (e.g., a bracket), a side bezel structure 321, a display 330, a front plate 340, a battery 350, a second support member 360 (e.g., a rear case), an antenna 370, and a back plate 380. In some embodiments, the electronic device 300 may omit at least one component (e.g., the first support member 320 or the second support member 360) among the aforementioned components, or may additionally include other component(s) not listed above. At least one of the components of the electronic device 300 may be the same as, or similar to, at least one of the components of the electronic device 100 illustrated in FIG. 1, and repetitive descriptions will hereinafter be omitted.

The printed circuit board 310 may have a processor, a memory, and/or an interface mounted thereon. The processor may include one or more of, for example, a central processing unit, an application processor, a graphic processing unit, an image signal processor, a sensor hub processor, or a communication processor. The memory may include, for example, a volatile memory or a nonvolatile memory. The interface may include, for example, a high definition multimedia interface (HDMI), a universal serial bus (USB) interface, an SD card interface, and/or an audio interface. The interface, for example, may electrically or physically connect the electronic device 300 with an external electronic device and may include a USB connector, an SD card/MMC connector, or an audio connector.

According to an embodiment, a sensor structure 311 including at least one of a plurality of camera modules and a sensor module may be mounted on the printed circuit board 310, and a block structure 312 (or assembly) into which at least a portion of the sensor structure 311 is inserted, may be disposed on the printed circuit board 310. The block structure 312 may be formed of, for example, a stainless steel material. The contents of the block structure may be formed by metal components, such as chromium (Cr) and nickel (Ni), may be varied depending on the standard (e.g., SUS). For example, the plurality of camera modules may include first and second camera modules (e.g., a front camera and a time-of-flight or "ToF" camera) that are located adjacent to each other, and at least a portion of the sensor module (e.g., a proximity sensor) may be disposed between the first and second camera modules.

The first support member 320 may be disposed in the electronic device 300 and may be connected with the side bezel structure 321, or may be integrally formed with the side bezel structure 321. The first support member 320 may be formed of, for example, a metallic material and/or a non-metallic (e.g., polymer) material. The printed circuit board 310 may be coupled to one surface of the first support member 320, and the display 330 may be coupled to an opposite surface of the first support member 320.

According to an embodiment, the first support member 320 may define a first hole 322, through which the block structure 312 passes. For example, the first hole 322 may be formed in a rectangular or oval shape that is open in the fore/aft direction of the first support member 320. According to another embodiment, an extension recess may be formed in the first hole 322 to correspond to the position of the sensor module (e.g., a sensor module 3113 of FIG. 2B) that is located in the first hole 322 or passes through the first hole 322. The extension recess may correspond to, for example, a portion of a protruding periphery of the block structure 312.

The display 330 may be coupled to the opposite surface of the first support member 320, and may be disposed in the housing 110 illustrated in FIG. 1. The display 330 may output contents (e.g., such as text, an image, a video, an icon, a widget, or a symbol), or may receive a touch input (e.g., such as a stationary touch, a gesture such as a drag, or a non-contact hover) from a user. The display 330 may include a display panel (not illustrated). The display panel may refer to a panel on which pixels (or sub-pixels) and signal lines for driving the pixels and generating images are disposed.

According to an embodiment, a second hole 331 corresponding to one portion of the first hole 322 may be formed on one side of the display 330, and a third hole 332 corresponding to the remaining portion of the first hole 322 may be formed on an opposite side of the display 330. For example, the third hole 332 may be formed in an oval shape, and the distance from one side to an opposite side of the third hole 332 may be longer than the distance from one side to an opposite side of the second hole 331. Signal lines electrically connected with the electronic device 300 may be disposed between the second hole 331 and the third hole 332 at different intervals. The sensor module may be disposed on the rear surface of the display 330 having the signal lines, and the signal lines may not be disposed in an area of the display 330 that vertically overlaps at least a portion of the sensor module. An inactive area having a higher transmittance than an active area by a specified magnitude may be formed between the second hole 331 and the third hole 332 and/or around the second hole 331 and the third hole 332. For example, the pixels (or the sub-pixels) and/or the signal lines may be disposed in the active area formed around the inactive area. The active area formed around the inactive area, for example, may be set to display a screen.

According to an embodiment, the display 330 may include a first edge 333a, a second edge 334a, a third edge 333b, and a fourth edge 334b. The first edge 333a may have, for example, a first length. The second edge 334a may have, for example, a second length greater than the first length. The third edge 333b, for example, may be disposed parallel to the first edge 333a. The fourth edge 334b, for example, may be disposed parallel to the second edge 334a. According to certain embodiments, the display 330 is visible through at least a portion of the front plate 340.

The battery 350 may supply power to at least one of the components of the electronic device 300 and may include, for example, a non-rechargeable primary cell, a rechargeable secondary cell, or a fuel cell. For example, at least a portion of the battery 350 may be disposed on substantially a same plane as the printed circuit board 310. The battery 350 may be integrally formed with the electronic device 300 (i.e. non-removable), or may be disposed within the device 300 so as to be detachable and removable from the electronic device 300 for replacement.

The antenna 370 may be disposed between the back plate 380 and the battery 350. The antenna 370 may include, for example, a near field communication (NFC) antenna, a wireless charging antenna, and/or a magnetic secure transmission (MST) antenna. For example, the antenna 370 may perform short range communication with an external device, or may wirelessly transmit and receive power utilized for charging. According to another embodiment, an antenna structure may be formed by a portion of the side bezel structure 321 and/or a portion of the first support member 320, or a combination thereof.

Figure 2B:
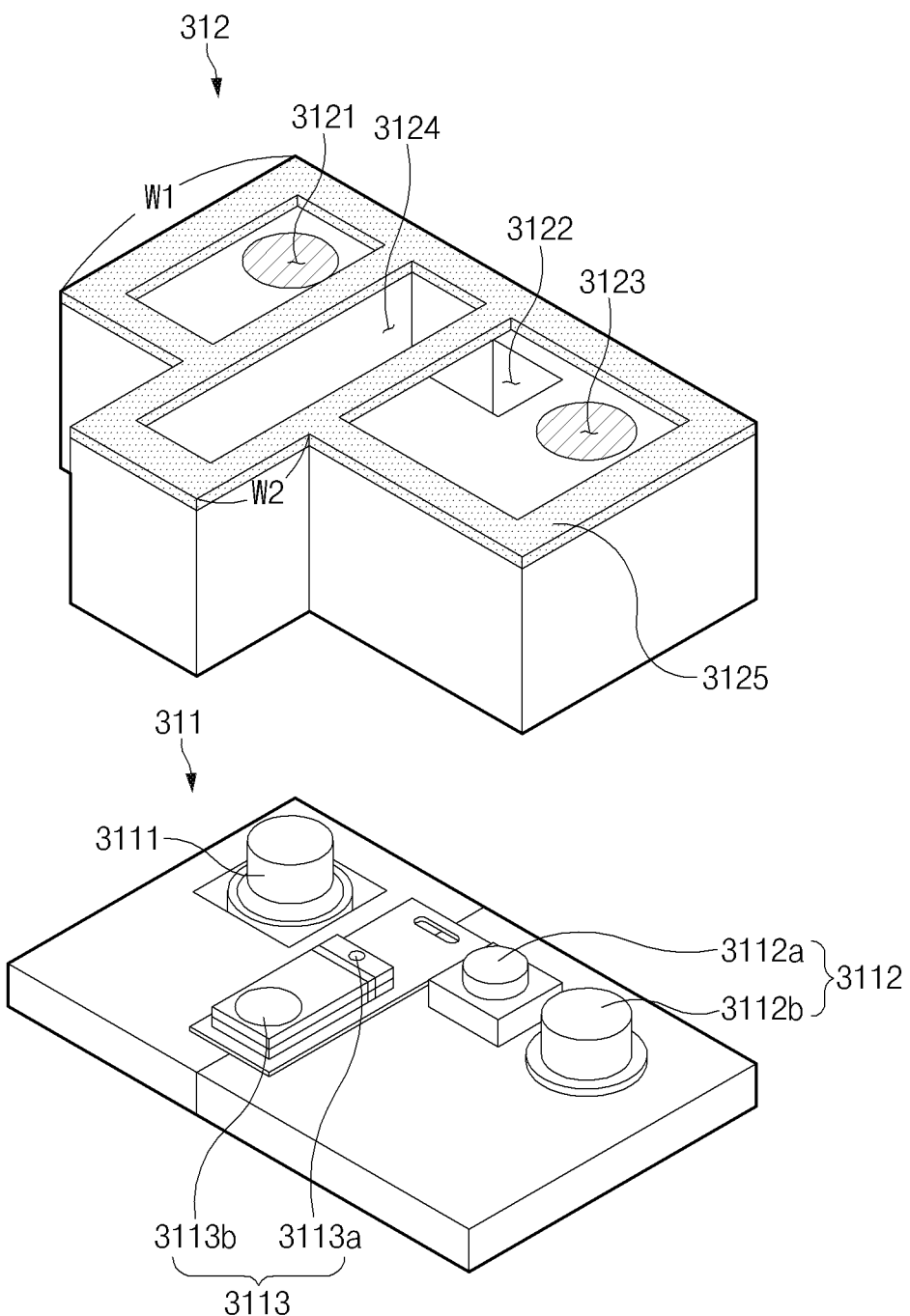
FIG. 2B is a view illustrating a sensor structure and a block structure of FIG. 2A according to an embodiment.

FIG. 2B is a view illustrating the sensor structure and the block structure of FIG. 2A according to an embodiment.

Referring to FIG. 2B, one side of the sensor structure 311 that is disposed around (e.g., partially surrounding) a first camera module 3111, a second camera module 3112, and the sensor module 3113 may correspond to a first width W1 of one side of the block structure 312 and a second width W1 extending from the first width W1. The sensor structure 311 may include, for example, the first camera module 3111 corresponding to a front camera, the second camera module 3112 corresponding to a ToF camera, and the sensor module 3113 corresponding to a proximity sensor. The second camera module 3112 may be located adjacent to the first camera module 3111 and may include a transmitter 3112a and a receiver 3112b. The transmitter 3112a may transmit, for example, a signal (e.g., a light signal, or other type of signal). The receiver 3112b may receive the signal that is reflected by a subject in front of the second camera module 3112 after transmission from the transmitter 3112a. For example, the second camera module 3112 corresponding to the ToF camera may calculate the distance from the subject by measuring the time lapse for the signal to return after reflecting off the subject. At least a portion of the sensor module 3113 may be disposed between the first camera module 3111 and the second camera module 3112. The block structure 312, according to an embodiment, may also have the first width W1 by which the first camera module 3111 and the second camera module 3112 are located, and the second width W2 by which the sensor module 3113 is located, and which extends from the first width W1. The block structure 312 may define first to fourth through-holes 3121 to 3124, such that the sensor structure 311 is inserted into the block structure 312. The block structure 312 may include an adhesive member 3125 (e.g., an optical clear adhesive (OCA)) that is coupled to the front surface of the block structure 312 and at least partially surrounds at least some of the first to fourth through-holes 3121 to 3124. The adhesive member 3125 may pass through the first hole 322 illustrated in FIG. 2A, and may be attached to the rear surface of the display 330 while at least partially surrounding at least a part of the second hole 331 and the third hole 332 illustrated in FIG. 2A. The block structure 312 of FIG. 2A, according to an embodiment, may pass through the first hole 322, such that the first camera module 3111 and the second camera module 3112 are disposed within the second hole 331 and the third hole 332, and the block structure 312 may remove steps between the modules 3111, 3112, and 3113 and may interrupt infiltration of dust.

Figure 3A:
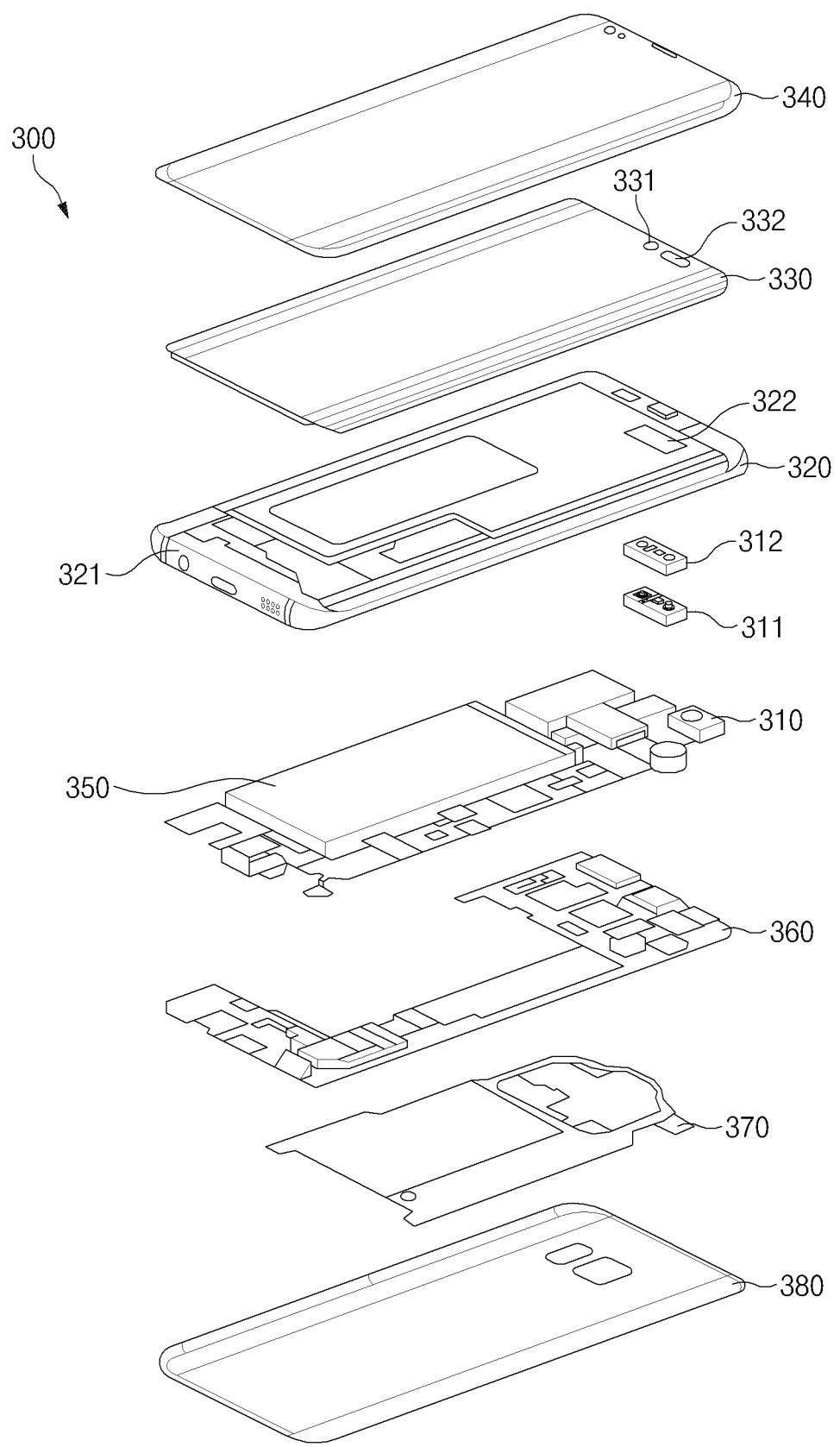
FIG. 3A is an exploded perspective view illustrating an electronic device according to a second embodiment.

FIG. 3A is an exploded perspective view illustrating an electronic device according to a second embodiment. At least one of components of the electronic device 300 illustrated in FIG. 3A may be the same as, or similar to, at least one of the components of the electronic device 300 illustrated in FIG. 2A, and repetitive descriptions will hereinafter be omitted.

According to an embodiment, a first support member 320 may define a first hole 322 through which a block structure 312 passes (e.g., is insertable). For example, the first hole 322 may be formed in a rectangular or oval shape that is open in the fore/aft direction of the first support member 320. According to another embodiment, unlike the first hole 322 of FIG. 2A, the first hole 322 of FIG. 3A may not define a protruding recess depending on a process by which the first support member 320 is machined (e.g., numerical information of a CNC machine tool).

Figure 3B:
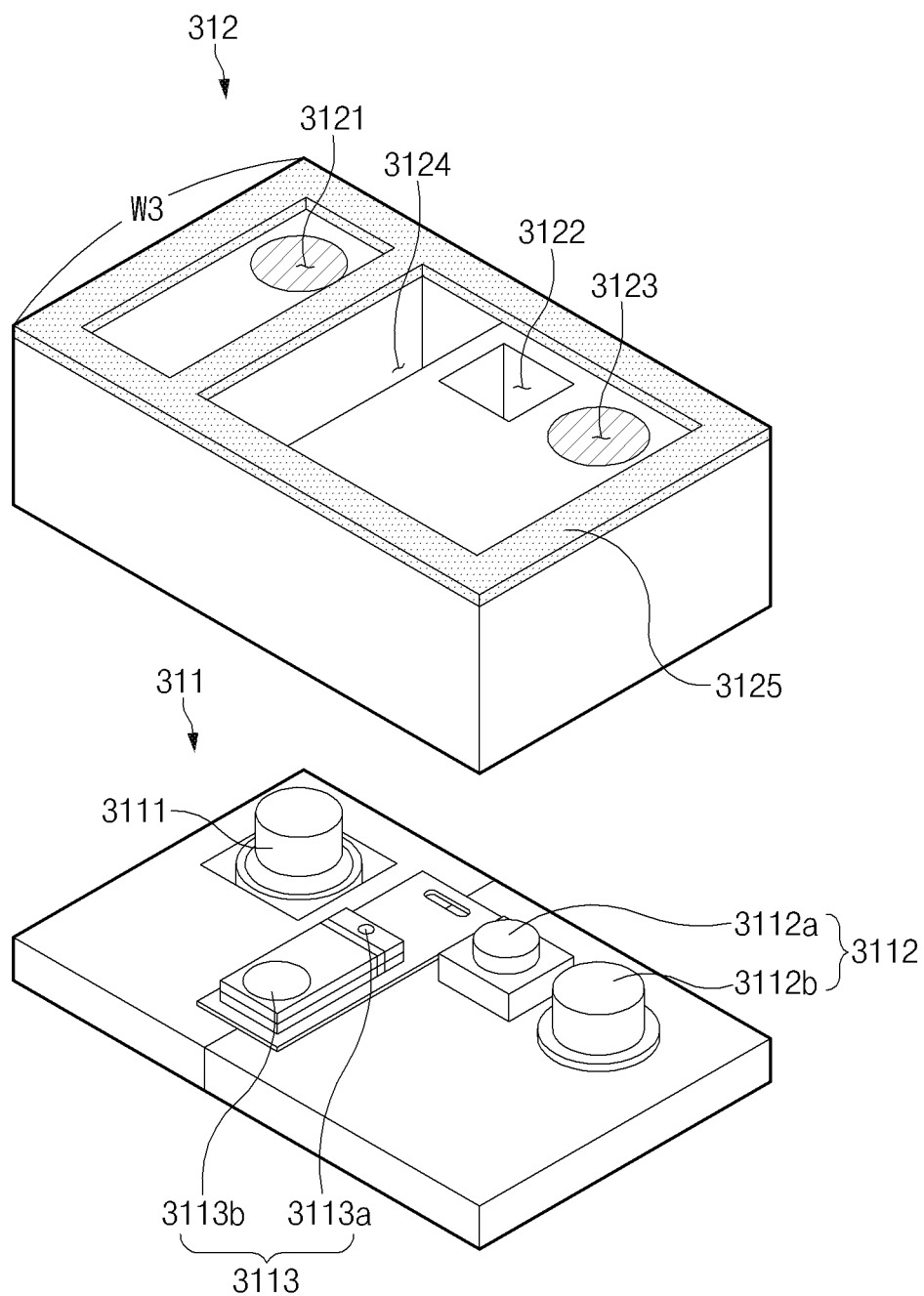
FIG. 3B is a view illustrating a sensor structure and a block structure of FIG. 3A according to certain embodiments.

FIG. 3B is a view illustrating a sensor structure and a block structure of FIG. 3A according to certain embodiments.

Referring to FIG. 3B, one side of the sensor structure 311 according to an embodiment may correspond to a third width W3 of one side of the block structure 312. The third width W3 may include, for example, the length of at least one of the first width W1 and the second width W2 of FIG. 2A. The block structure 312 according to an embodiment may include an adhesive member 3125 (e.g., an optical clear adhesive (OCA)) that is coupled to the front surface of the block structure 312 while surrounding at least some of first to fourth through-holes 3121, 3122, 3123 and 3124. The adhesive member 3125 may pass through the first hole 322 illustrated in FIG. 3A and may be attached to the rear surface of a display 330 while surrounding at least a part of a second hole 331 and a third hole 332 illustrated in FIG. 3A. The block structure 312 of FIG. 3A according to an embodiment may pass through the first hole 322 such that a first camera module 3111 and a second camera module 3112 are disposed in the second hole 331 and the third hole 332, and the block structure 312 may remove steps between the modules 3111, 3112, and 3113 and may interrupt infiltration of dust.

Figure 3C:
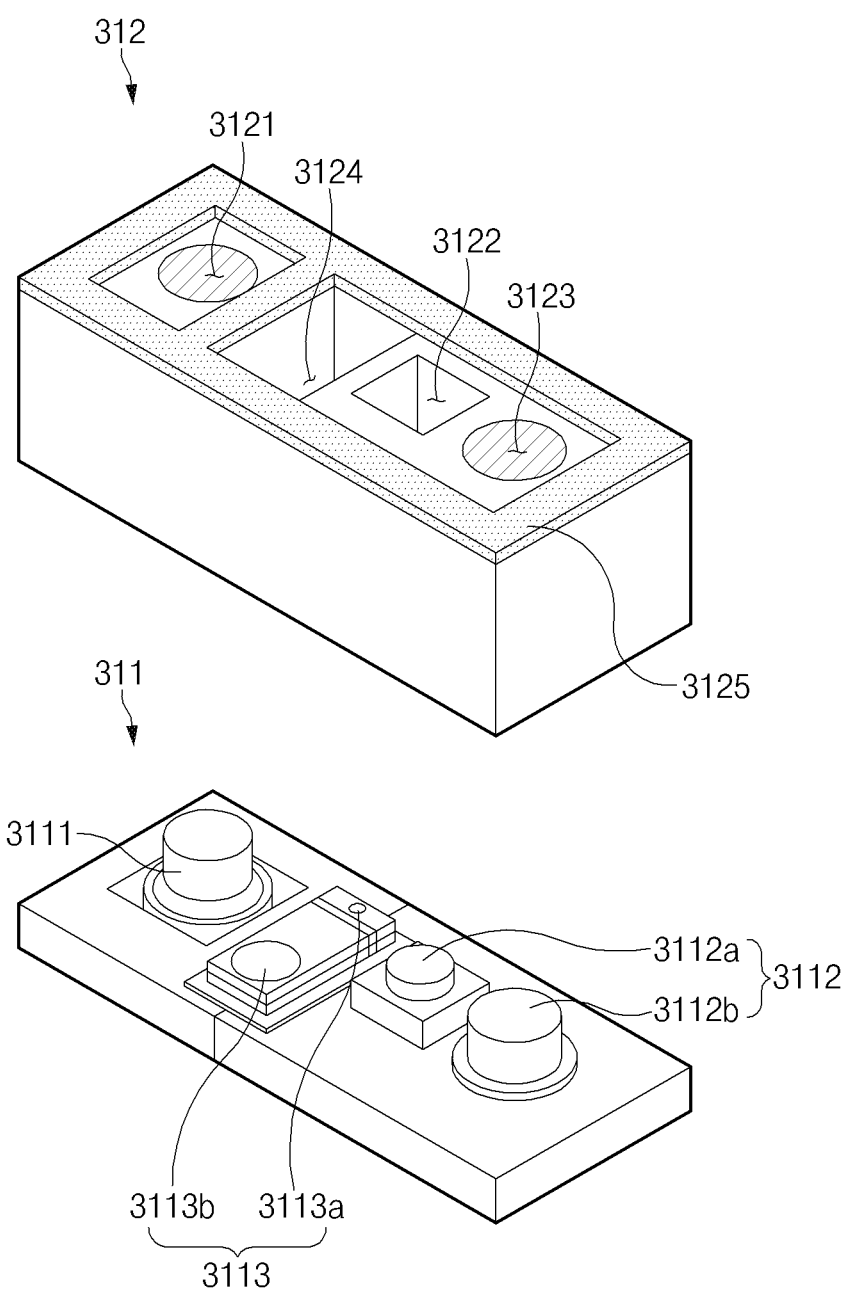
FIG. 3C is a view illustrating a sensor structure and a block structure of FIG. 3A according to certain embodiments.

FIG. 3C is a view illustrating a sensor structure and a block structure of FIG. 3A according to certain embodiments. At least one of the components of the electronic device 300 illustrated in FIG. 3C may be the same as, or similar to, at least one of the components of the electronic device 300 illustrated in FIG. 3B, and repetitive descriptions will hereinafter be omitted.

Referring to FIG. 3C, one side of the sensor structure 311, according to an embodiment, may correspond to a first width W1 of the block structure 312. The block structure 312, according to an embodiment, may include a first width W1 corresponding to the lengths of a first camera module 3111, a second camera module 3112, and a sensor module 3113 is formed. For example, the sensor module 3113 may have a different size from the sensor module 3113 of FIG. 3A. As described above with reference to FIG. 3B, the block structure 312 may include an adhesive member 3125 coupled thereto, and the adhesive member 3125 may be attached to the rear surface of the display 330. Accordingly, the block structure 312 may block the infiltration of dust.

Figure 3D:
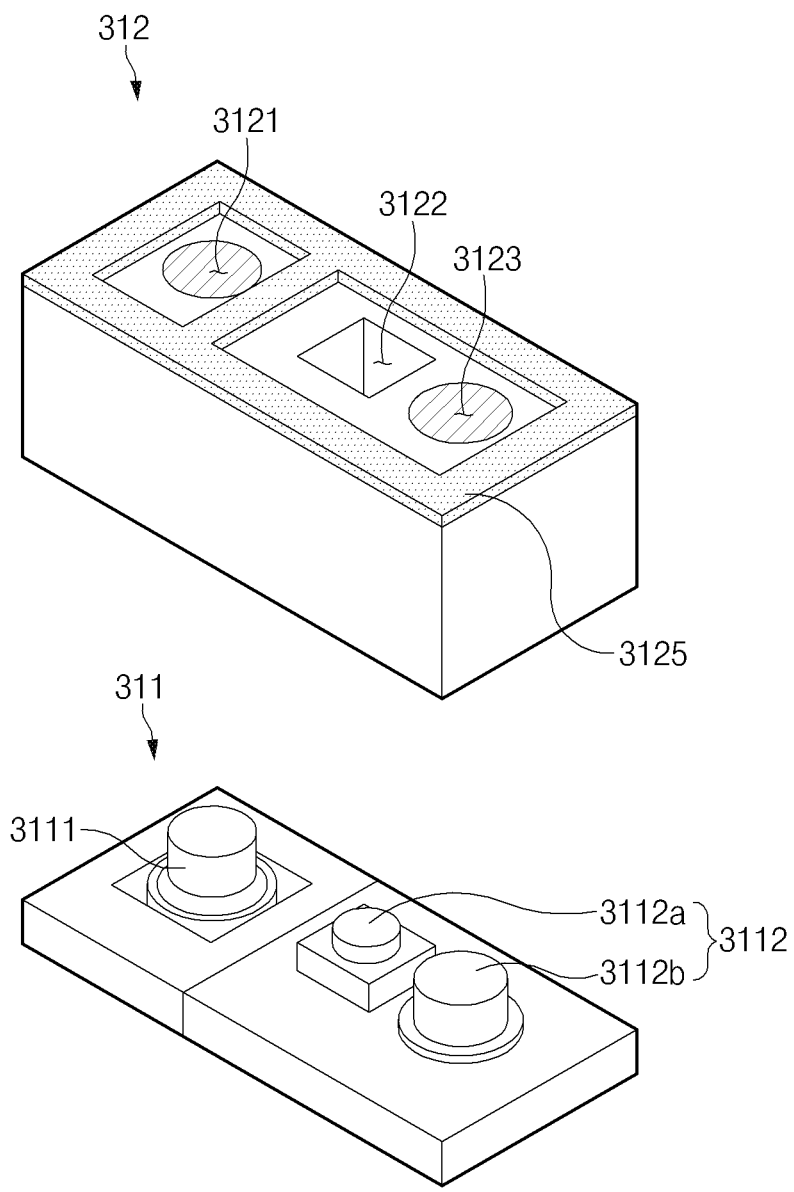
FIG. 3D is a view illustrating a sensor structure and a block structure of FIG. 3A according to certain embodiments.

FIG. 3D is a view illustrating a sensor structure and a block structure of FIG. 3A according to certain embodiments. At least one of components of the electronic device 300 illustrated in FIG. 3C may be the same as, or similar to, at least one of the components of the electronic device 300 illustrated in FIG. 3C, and repetitive descriptions will hereinafter be omitted.

Referring to FIG. 3D, one side of the sensor structure 311, according to an embodiment, may correspond to a first width W1 of the block structure 312. The sensor structure 311 may not include, for example, the sensor module 3113 of FIG. 3B (or FIG. 3C). The block structure 312, according to an embodiment, may have the first width W1, which corresponds to the lengths of a first camera module 3111 and a second camera module 3112. The block structure 312 may not include, for example, a fourth through-hole (e.g., the fourth through-hole 3124 of FIG. 3B or FIG. 3C) into which the sensor module 3113 of FIG. 3B (or FIG. 3C) is inserted. Accordingly, the length may be reduced proportionately by the omission of the fourth through-hole. As described above with reference to FIG. 3B, the block structure 312 may include an adhesive member 3125 coupled thereto, and the adhesive member 3125 may be attached to the rear surface of the display 330. Accordingly, the block structure 312 may interrupt infiltration of dust.

The embodiments illustrated in FIGS. 3A to 3D in this disclosure are illustrative, and the disclosure is not limited to those illustrated in FIGS. 3A to 3D. For example, unlike in the embodiments of FIGS. 3A to 3D, a sensor structure 311 may include modules different from the modules 3111, 3112, and 3113 included in the sensor structures 311 illustrated in FIGS. 3A to 3D, and a block structure 312 may have a different structure from the block structures 312 illustrated in FIGS. 3A to 3D. Furthermore, in this disclosure, the contents described above with reference to FIGS. 2 and 3A to 3D may be identically applied to components having the same reference numerals as the components included in the electronic devices 300 illustrated in FIGS. 2 and 3A to 3D.

Figure 4A:
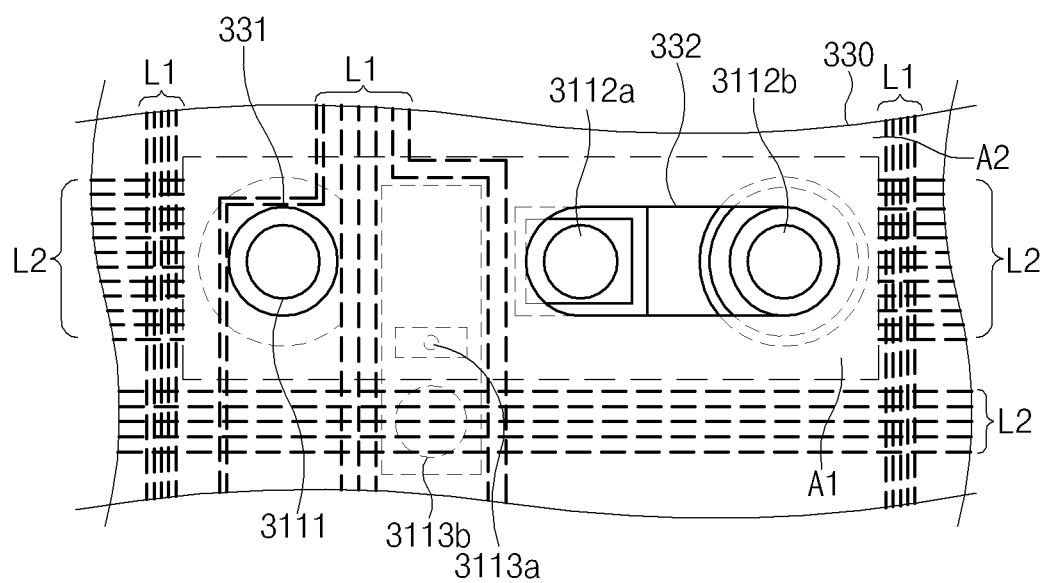
FIG. 4A is a view illustrating the positions of signals lines of a display and sensors of FIG. 3A according to certain embodiments.

FIG. 4A is a view illustrating the positions of signals lines of the display and sensors of FIG. 3A according to certain embodiments.

Referring to FIGS. 3B and 4A, the display 330, according to an embodiment, may include the second hole 331 and the third hole 332. The second hole 331 and the third hole 332 may be separated from each other at a predetermined interval (e.g., 3 mm) and may be open in the fore/aft direction of the display 330. At least some of first signal lines L1 (e.g., data lines) and second signal lines L2 (e.g., gate lines) that are electrically connected with the electronic device (e.g., the electronic device 300 of FIG. 2) may be disposed between the second hole 331 and the third hole 332 at different intervals. According to an embodiment, some of the first signal lines L1 may be disposed side by side on one side, and other first signal lines L1 may be disposed on an opposite side in an arrangement that is broken or otherwise disrupted or interrupted one or more times. The first signal lines L1 and the second signal lines L2 may refer to, for example, signal lines for driving pixels (or sub-pixels) of the display panel. At least a portion of the sensor module 3113 may be located below the display 330, having the first signal lines L1 and the second signal lines L2 arranged therein. According to an embodiment, the first signal lines L1 may be disposed at different intervals in an inactive area A1 between the second hole 331 and the third hole 332, and the sensor module 3113 may be disposed below the inactive area A1. Accordingly, a signal (i.e., a light) generated by a light emitting part 3113a may be transmitted through the display 330 through the inactive area A1. The inactive area A1 may be formed to have a higher light transmittance rate than the active area A2, because components such as pixels and TFTs are not disposed in the inactive area A1. The pixels (or sub-pixels), the first signal lines L1, and/or the second signal lines L2 may be arranged in the active area A2 formed around the inactive area A1. For example, in the active area A2 located around the second hole 331, the first signal lines L1 may be disposed on opposite sides of the first camera module 3111 (or the second camera module 3112). The second signal lines L2 may also be disposed on the opposite sides of the first camera module 3111 (or the second camera module 3112). According to certain embodiments, the first camera module 3111 may be disposed in the second hole 331, and a transmitter 3112a and a receiver 3112b of the second camera module 3112 (e.g., a ToF camera) may be disposed in the third hole 332. For example, the third hole 332 may be formed in an oval shape such that the transmitter 3112a and the receiver 3112b are disposed close to the third hole 332.

According to certain embodiments, the display 330 may include a plurality of data lines (e.g., the first signal lines L1), a plurality of gate lines (e.g., the second signal lines L2), a first opening (e.g., the second hole 331), and a second opening (e.g., the third hole 332). For example, between a first edge (e.g., the first edge 333a of FIG. 2A) and a third edge (e.g., the third edge 333b of FIG. 2A) of the display 330, the plurality of data lines may extend substantially parallel to a second edge (e.g., the second edge 334a of FIG. 2A). The plurality of gate lines may extend from the second edge of the display 330 so as to be substantially parallel to a fourth edge (e.g., the fourth edge 334b of FIG. 2A) and may be electrically connected with the data lines. According to an embodiment, the plurality of gate lines may be disposed between the fourth edge and the first opening and may thus avoid (e.g., not be disposed in) the area in which the first opening is disposed. According to an embodiment, the plurality of gate lines may be disposed between the second edge and the second opening and may thus avoid (e.g., not be disposed in) the area in which the second opening is disposed. The first opening, for example, may be formed adjacent to the first edge of the display 330. The second opening, for example, may be formed to be spaced apart from the first edge of the display 330 and may be aligned with the first opening so as to be substantially parallel to the first edge. According to an embodiment, when viewed from above the display 330, some of a first plurality of data lines among the data lines may be disposed in a first area (e.g., the inactive area A1) between the first opening and the second opening at different intervals. In some embodiments, when viewed from above the display 330, some of the first plurality of data lines among the data lines may be disposed side by side on one side of the first area between the first opening and the second opening, and other data lines among the first plurality of data lines may be disposed on an opposite side of the first area between the first opening and the second opening in a form that is broken one or more times. According to an embodiment, when viewed from above the display 330, some of a second plurality of data lines among the data lines may be disposed in a second area (e.g., the active area A2) between the first opening and the fourth edge. Furthermore, the intervals at which some of the second plurality of data lines are disposed in the second area may be narrower than the intervals at which some of the first plurality of data lines are disposed in the first area. According to an embodiment, when viewed from above the display 330, some of a third plurality of data lines among the data lines may be disposed in a third area (e.g., the active area A2) between the second opening and the second edge. Furthermore, the intervals at which some of the third plurality of data lines are disposed in the third area may be narrower than the intervals at which some of the first plurality of data lines are disposed in the first area.

Figure 4B:
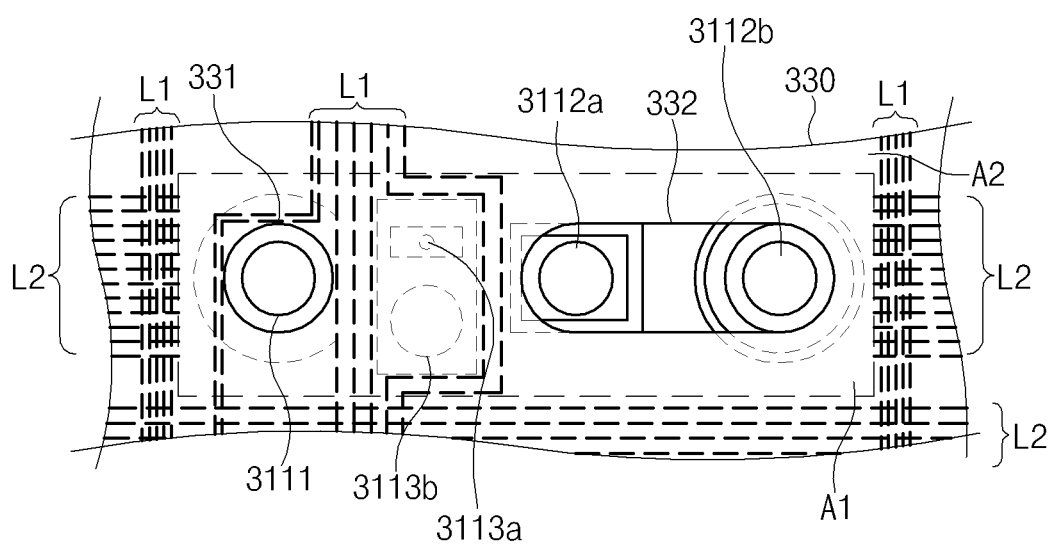
FIG. 4B is a view illustrating the positions of signals lines of a display and sensors of FIG. 3A according to certain embodiments.

FIG. 4B is a view illustrating the positions of signals lines of the display and sensors of FIG. 3A according to certain embodiments. At least one of components of the electronic device 300 illustrated in FIG. 4B may be the same as, or similar to, at least one of the components of the electronic device 300 illustrated in FIG. 4A, and repetitive descriptions will hereinafter be omitted.

Referring to FIGS. 3C and 4B, the display 330, according to an embodiment, may include the second hole 331 and the third hole 332. At least some of first signal lines L1 (e.g., data lines) and second signal lines L2 (e.g., gate lines) that are electrically connected with the electronic device (e.g., the electronic device 300 of FIG. 2) may be disposed between the second hole 331 and the third hole 332 at different intervals. According to an embodiment, some of the first signal lines L1 may be disposed side by side on one side, and other first signal lines L1 may be disposed on an opposite side in a form that is broken at least two times. At least a portion of the sensor module 3113 may be located below the display 330 having the first signal lines L1 and the second signal lines L2 arranged therein. According to an embodiment, the first signal lines L1 may be disposed at different intervals in an inactive area A1 between the second hole 331 and the third hole 332, and the sensor module 3113 may be disposed below the inactive area A1. Accordingly, a signal (e.g., a light signal) generated by a light emitting part 3113a may be transmitted through the inactive area A1, and, after being reflected back towards the device, may pass through the inactive area A1 again to reach a light receiving part 3113b.

Figure 4C:
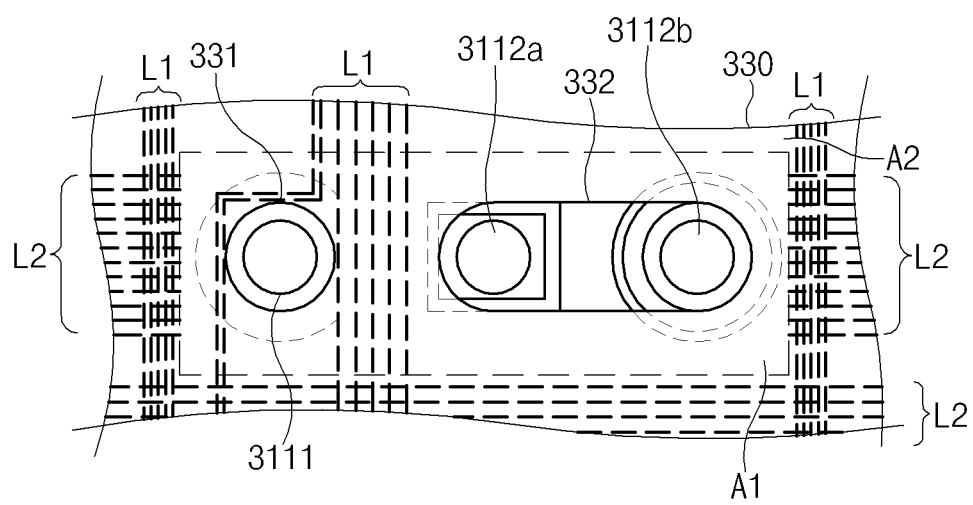
FIG. 4C is a view illustrating signals lines of a display of FIG. 3A according to certain embodiments.

FIG. 4C is a view illustrating signals lines of the display of FIG. 3A according to certain embodiments. At least one of components of the electronic device 300 illustrated in FIG. 4C may be the same as, or similar to, at least one of the components of the electronic device 300 illustrated in FIG. 4A, and repetitive descriptions will hereinafter be omitted.

Referring to FIGS. 3D and 4C, the display 330 according to an embodiment may include the second hole 331 and the third hole 332. At least some of first signal lines L1 (e.g., data lines) and second signal lines L2 (e.g., gate lines) that are electrically connected with the electronic device (e.g., the electronic device 300 of FIG. 2) may be disposed between the second hole 331 and the third hole 332. According to an embodiment, the first signal lines L1, for example, may be disposed side by side from one side to an opposite side of an inactive area A1.

Figure 5:
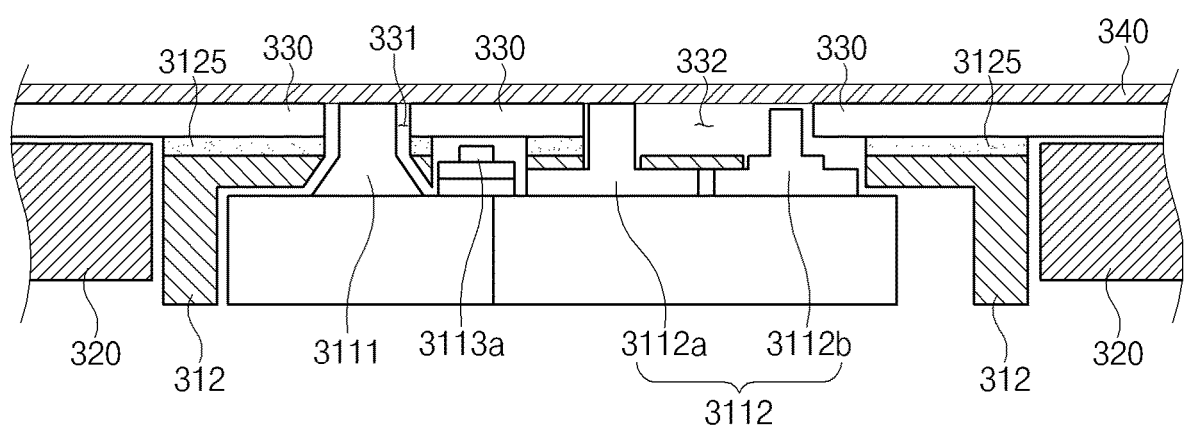
FIG. 5 is a sectional view illustrating a sensor structure, a first support member, a display, and a front plate of FIG. 2A according to an embodiment, where

FIG. 5 is a sectional view illustrating a sensor structure, a first support member, a display, and a front plate of FIG. 2A according to an embodiment, where FIG. 5 is a sectional view taken along line A-A' of FIG. 2A.

Referring to FIG. 5, a sensor structure (e.g., the sensor structure 311 of FIG. 2A) according to an embodiment may pass through a first support member 320 in the state of being inserted into a block structure 312. For example, the block structure 312 may cover the periphery of the sensor structure that is inserted into the block structure 312 from back to front. An adhesive member 3125 that is the same as, or similar to, the adhesive member 3125 of FIG. 2B may be located between the block structure 312 and the sensor structure to connect the block structure 312 and the sensor structure. For example, a first camera module 3111 and a second camera module 3112 of the sensor structure may be disposed in a second hole 331 and a third hole 332 of a display 330 after passing through the first support member 320. The first camera module 3111 and the second camera module 3112 may transmit and receive a signal (or light) through the second hole 331 and the third hole 332. For example, the first camera module 3111 and the second camera module 3112 may be disposed in lower portions of the second hole 331 and the third hole 332, or may be disposed at the same height as, or in a lower position than, the surface of the second hole 331 and the third hole 332. In another example, at least a light emitting part 3113a among components of a sensor module (e.g., the sensor module 3113 of FIG. 2B) may be located between the second hole 331 and the third hole 332 after passing through the first support member 320. The light emitting part 3113a may be located in an inactive area of the display 330 and may increase the transmittance of a signal (or light) emitted. The inactive area where signal lines are arranged in different forms may be formed between the second hole 331 and the third hole 332 of the display 330. The adhesive member 3125 on the front surface of the block structure 312 may be attached to the rear surface of the display 330 while surrounding at least the first camera module 3111 and the second camera module 3112 and may form a dustproof structure between the first support member 320 and the display 330. In some embodiments, a front plate 340 may be coupled to the front surface of the display 330 having the second hole 331 and the third hole 332 into which the first camera module 3111 and the second camera module 3112 are inserted. The front plate 340 may transmit light generated by the display 330. Furthermore, a user may perform a touch (including contact using an electronic pen) by touching the front plate 340 with a part (e.g., a finger) of the user's body. The front plate 340 may be formed of, for example, reinforced glass, reinforced plastic, or a flexible polymer material. According to an embodiment, the front plate 340 may be referred to as a glass window, a window, or a transparent member.

According to certain embodiments, a support member (e.g., the first support member 320) may be disposed between the display 330 and a back plate (e.g., the back plate 380 of FIG. 2A). Furthermore, a first image (or optical) sensor (e.g., the first camera module 3111) and a second image (or optical) sensor (e.g., the second camera module 3112) may be disposed on the support member. The first image (or optical) sensor may be coupled to the support member and may be disposed to be directed in a first direction through a first opening (e.g., the second hole 331). The first image (or optical) sensor, for example, may support at least one of functions of a front camera. The second image (or optical) sensor may be coupled to the support member and may be disposed to be directed in the first direction through a second opening (e.g., the third hole 332). The second image (or optical) sensor, for example, may support at least one of functions of a ToF camera.

Figure 6:
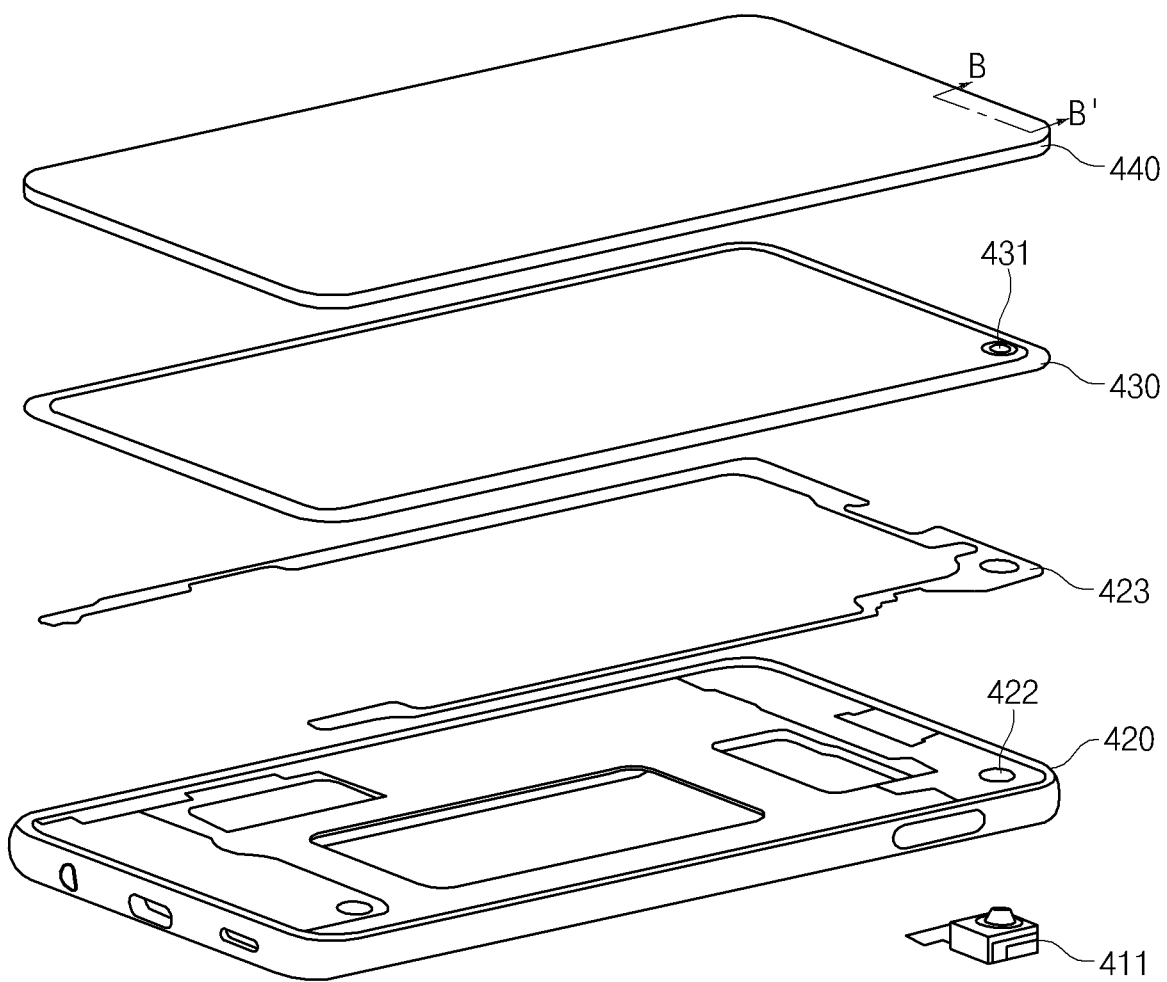
FIG. 6 is an exploded perspective view illustrating some components of an electronic device according to certain embodiments.

FIG. 6 is an exploded perspective view illustrating some components of an electronic device according to certain embodiments. At least one of components of the electronic device 300 illustrated in FIG. 6 may be the same as, or similar to, at least one of the components of the electronic device 300 illustrated in FIG. 2A, and repetitive descriptions will hereinafter be omitted.

Referring to FIG. 6, the electronic device (e.g., 300 of FIG. 2A) according to certain embodiments may include a first camera module 411, a first support member 420, an adhesive member 423, a display 430, and a front plate 440. The first support member 420 may have a first hole 422 through which the first camera module 411 passes and that has a different form from the first hole 322 illustrated in FIG. 2A. For example, the first camera module 411 other than a portion of a sensor structure (e.g., the sensor structure 311 of FIG. 2A) and a block structure (e.g., the block structure 312 of FIG. 2A) may pass through the first hole 422 of a different form. For example, a second camera module or a sensor module may pass through the first hole 422 instead of the first camera module 411. The adhesive member 423 may be disposed on the front surface of the first support member along the periphery of the first support member 420 including the first hole 422. The adhesive member 423 may a characteristic that is the same as, or similar to, the characteristic of the adhesive member 3125 illustrated in FIG. 2B. Furthermore, another hole corresponding to the first hole 422 may be formed in the adhesive member 423. The first camera module 411 passing through the first hole 422 may pass through the other hole. A second hole 431 having a different form from the second hole 331 illustrated in FIG. 2A may be formed to correspond to the first hole 422 and the other hole of the adhesive member 423. For example, the first camera module 411 passing through the first hole 422 and the other hole of the adhesive member 423 may be inserted into the second hole 431.

Figure 7:
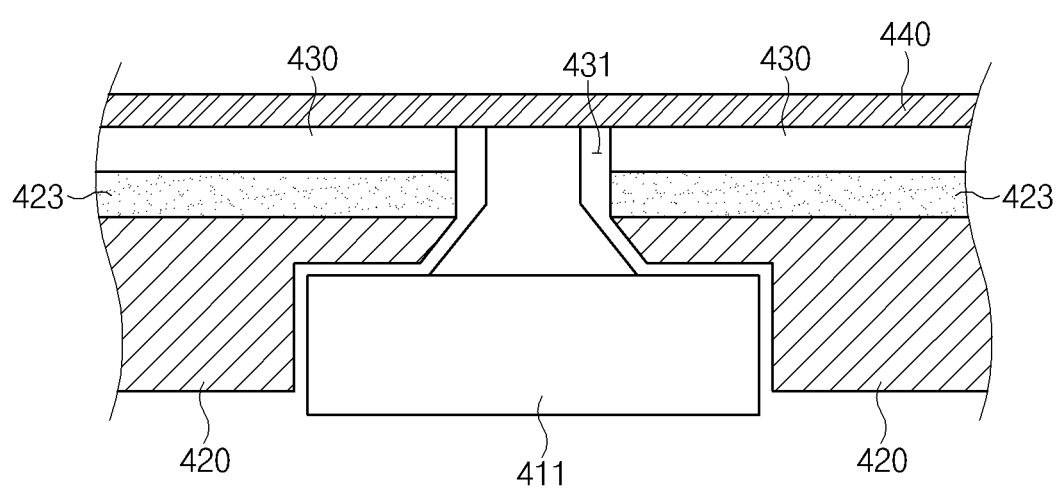
FIG. 7 is a sectional view illustrating stacked components of FIG. 6 according to an embodiment, where

FIG. 7 is a sectional view illustrating stacked components of FIG. 6 according to an embodiment, where FIG. 7 is a sectional view taken along line B-B' of FIG. 6. At least one of components of the electronic device 300 illustrated in FIG. 7 may be the same as, or similar to, at least one of the components of the electronic device 300 illustrated in FIG. 5, and repetitive descriptions will hereinafter be omitted.

Referring to FIG. 7, the first camera module 411 according to certain embodiments may pass through the first support member 420 and may be inserted into the display 430. The first support member 420 may be coupled with the display 430 through the adhesive member 423 that covers the peripheral portion through which the first camera module 411 passes and at least a portion of the front surface of the first support member 420. The adhesive member 423 on the front surface of the first support member 420 may be attached to the rear surface of the display 430 while surrounding at least the first camera module 411 and may form a dustproof barrier or structure between the first support member 420 and the display 430. For example, an adhesive member that is the same as, or similar to, the adhesive member 423 may be located between a first hole of a different form (e.g., the first hole 422 of FIG. 6) and the first camera module 411 to connect the first hole and the first camera module 411. In some embodiments, the front plate 440 may be coupled to the front surface of the display 430 having the second hole 431 into which the first camera module 411 is inserted.

According to certain embodiments, an electronic device (e.g., the electronic device 100 of FIG. 1) may include the first camera module 411 (e.g., a front camera or a ToF camera), the first support member 420, the adhesive member 423, the display 430, and the front plate 440.

According to an embodiment, the first camera module 411 may be disposed on one side of a printed circuit board (e.g., the printed circuit board 310 of FIG. 2A). The first camera module 411, for example, may pass through one side of the first support member 420.

According to an embodiment, the first support member 420 may have a first hole (e.g., the first hole 422 of FIG. 6) through which the first camera module 411 passes. For example, the first hole may be formed to be open in the fore/aft direction of the first support member 420.

According to an embodiment, the adhesive member 423 may be attached to the rear surface of the display 430 while surrounding at least a portion of the first hole (e.g., the first hole 422 of FIG. 6). At least a portion of the first camera module 411 that passes through the first hole may be disposed on one side of the adhesive member 423.

According to an embodiment, the display 430 may have the second hole 431 corresponding to a portion of the first hole (e.g., the first hole 422 of FIG. 6). For example, signal lines (e.g., data lines and gate lines) that are electrically connected with the electronic device 300 may be disposed around the second hole 431 at different intervals. According to some embodiments, the signal lines may not be disposed on an area of the display 430 that vertically overlaps at least a portion of the sensor module.

Figure 8:
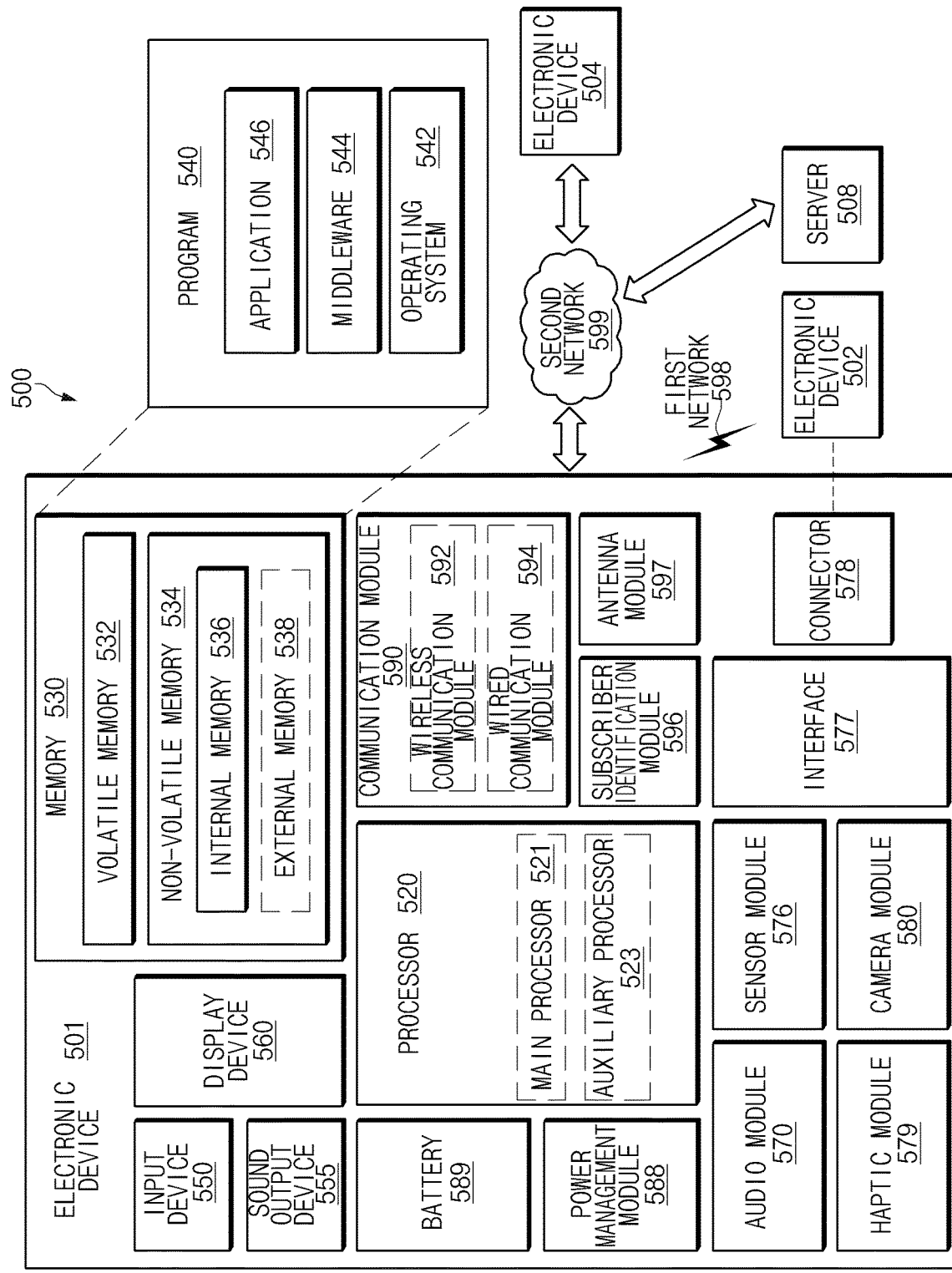
FIG. 8 is a block diagram illustrating an electronic device in a network environment according to certain embodiments.

FIG. 8 is a block diagram illustrating an electronic device 501 in a network environment 500 according to certain embodiments. Referring to FIG. 5, the electronic device 501 in the network environment 500 may communicate with an electronic device 502 via a first network 598 (e.g., a short-range wireless communication network), or an electronic device 504 or a server 508 via a second network 599 (e.g., a long-range wireless communication network). According to an embodiment, the electronic device 501 may communicate with the electronic device 504 via the server 508. According to an embodiment, the electronic device 501 may include a processor 520, memory 530, an input device 550, a sound output device 555, a display device 560, an audio module 570, a sensor module 576, an interface 577, a haptic module 579, a camera module 580, a power management module 588, a battery 589, a communication module 590, a subscriber identification module (SIM) 596, or an antenna module 597. In some embodiments, at least one (e.g., the display device 560 or the camera module 580) of the components may be omitted from the electronic device 501, or one or more other components may be added in the electronic device 501. In some embodiments, some of the components may be implemented as single integrated circuitry. For example, the sensor module 576 (e.g., a fingerprint sensor, an iris sensor, or an illuminance sensor) may be implemented as embedded in the display device 560 (e.g., a display).

The processor 520 may execute, for example, software (e.g., a program 540) to control at least one other component (e.g., a hardware or software component) of the electronic device 501 coupled with the processor 520, and may perform various data processing or computation. According to an embodiment, as at least part of the data processing or computation, the processor 520 may load a command or data received from another component (e.g., the sensor module 576 or the communication module 590) in volatile memory 532, process the command or the data stored in the volatile memory 532, and store resulting data in non-volatile memory 534. According to an embodiment, the processor 520 may include a main processor 521 (e.g., a central processing unit (CPU) or an application processor (AP)), and an auxiliary processor 523 (e.g., a graphics processing unit (GPU), an image signal processor (ISP), a sensor hub processor, or a communication processor (CP)) that is operable independently from, or in conjunction with, the main processor 521. Additionally or alternatively, the auxiliary processor 523 may be adapted to consume less power than the main processor 521, or to be specific to a specified function. The auxiliary processor 523 may be implemented as separate from, or as part of the main processor 521.

The auxiliary processor 523 may control at least some of functions or states related to at least one component (e.g., the display device 560, the sensor module 576, or the communication module 590) among the components of the electronic device 501, instead of the main processor 521 while the main processor 521 is in an inactive (e.g., sleep) state, or together with the main processor 521 while the main processor 521 is in an active state (e.g., executing an application). According to an embodiment, the auxiliary processor 523 (e.g., an image signal processor or a communication processor) may be implemented as part of another component (e.g., the camera module 580 or the communication module 590) functionally related to the auxiliary processor 523.

The memory 530 may store various data used by at least one component (e.g., the processor 520 or the sensor module 576) of the electronic device 501. The various data may include, for example, software (e.g., the program 540) and input data or output data for a command related thereto. The memory 530 may include the volatile memory 532 or the non-volatile memory 534.

The program 540 may be stored in the memory 530 as software, and may include, for example, an operating system (OS) 542, middleware 544, or an application 546.

The input device 550 may receive a command or data to be used by other component (e.g., the processor 520) of the electronic device 501, from the outside (e.g., a user) of the electronic device 501. The input device 550 may include, for example, a microphone, a mouse, a keyboard, or a digital pen (e.g., a stylus pen).

The sound output device 555 may output sound signals to the outside of the electronic device 501. The sound output device 555 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 560 may visually provide information to the outside (e.g., a user) of the electronic device 501. The display device 560 may include, for example, a display, a hologram device, or a projector and control circuitry to control a corresponding one of the display, hologram device, and projector. According to an embodiment, the display device 560 may include touch circuitry adapted to detect a touch, or sensor circuitry (e.g., a pressure sensor) adapted to measure the intensity of force incurred by the touch.

The audio module 570 may convert a sound into an electrical signal and vice versa. According to an embodiment, the audio module 570 may obtain the sound via the input device 550, or output the sound via the sound output device 555 or a headphone of an external electronic device (e.g., an electronic device 502) directly (e.g., wiredly) or wirelessly coupled with the electronic device 501.

The sensor module 576 may detect an operational state (e.g., power or temperature) of the electronic device 501 or an environmental state (e.g., a state of a user) external to the electronic device 501, and then generate an electrical signal or data value corresponding to the detected state. According to an embodiment, the sensor module 576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 577 may support one or more specified protocols to be used for the electronic device 501 to be coupled with the external electronic device (e.g., the electronic device 502) directly (e.g., wiredly) or wirelessly. According to an embodiment, the interface 577 may include, for example, a high definition multimedia interface (HDMI), a universal serial bus (USB) interface, a secure digital (SD) card interface, or an audio interface.

A connecting terminal 578 may include a connector via which the electronic device 501 may be physically connected with the external electronic device (e.g., the electronic device 502). According to an embodiment, the connecting terminal 578 may include, for example, a HDMI connector, a USB connector, a SD card connector, or an audio connector (e.g., a headphone connector).

The haptic module 579 may convert an electrical signal into a mechanical stimulus (e.g., a vibration or a movement) or electrical stimulus which may be recognized by a user via his tactile sensation or kinesthetic sensation. According to an embodiment, the haptic module 579 may include, for example, a motor, a piezoelectric element, or an electric stimulator.

The camera module 580 may capture a still image or moving images. According to an embodiment, the camera module 580 may include one or more lenses, image sensors, image signal processors, or flashes.

The power management module 588 may manage power supplied to the electronic device 501. According to an embodiment, the power management module 588 may be implemented as at least part of, for example, a power management integrated circuit (PMIC).

The battery 589 may supply power to at least one component of the electronic device 501. According to an embodiment, the battery 589 may include, for example, a primary cell which is not rechargeable, a secondary cell which is rechargeable, or a fuel cell.

The communication module 590 may support establishing a direct (e.g., wired) communication channel or a wireless communication channel between the electronic device 501 and the external electronic device (e.g., the electronic device 502, the electronic device 504, or the server 508) and performing communication via the established communication channel. The communication module 590 may include one or more communication processors that are operable independently from the processor 520 (e.g., the application processor (AP)) and supports a direct (e.g., wired) communication or a wireless communication. According to an embodiment, the communication module 590 may include a wireless communication module 592 (e.g., a cellular communication module, a short-range wireless communication module, or a global navigation satellite system (GNSS) communication module) or a wired communication module 594 (e.g., a local area network (LAN) communication module or a power line communication (PLC) module). A corresponding one of these communication modules may communicate with the external electronic device via the first network 598 (e.g., a short-range communication network, such as Bluetooth™, wireless-fidelity (Wi-Fi) direct, or infrared data association (IrDA)) or the second network 599 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 592 may identify and authenticate the electronic device 501 in a communication network, such as the first network 598 or the second network 599, using subscriber information (e.g., international mobile subscriber identity (IMSI)) stored in the subscriber identification module 596.

The antenna module 597 may transmit or receive a signal or power to or from the outside (e.g., the external electronic device) of the electronic device 501. According to an embodiment, the antenna module 597 may include an antenna including a radiating element implemented using a conductive material or a conductive pattern formed in or on a substrate (e.g., PCB). According to an embodiment, the antenna module 597 may include a plurality of antennas. In such a case, at least one antenna appropriate for a communication scheme used in the communication network, such as the first network 598 or the second network 599, may be selected, for example, by the communication module 590 (e.g., the wireless communication module 592) from the plurality of antennas. The signal or the power may then be transmitted or received between the communication module 590 and the external electronic device via the selected at least one antenna. According to an embodiment, another component (e.g., a radio frequency integrated circuit (RFIC)) other than the radiating element may be additionally formed as part of the antenna module 597.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 501 and the external electronic device 504 via the server 508 coupled with the second network 599. Each of the electronic devices 502 and 504 may be a device of a same type as, or a different type, from the electronic device 501. According to an embodiment, all or some of operations to be executed at the electronic device 501 may be executed at one or more of the external electronic devices 502, 504, or 508. For example, if the electronic device 501 should perform a function or a service automatically, or in response to a request from a user or another device, the electronic device 501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 501. The electronic device 501 may provide the outcome, with or without further processing of the outcome, as at least part of a reply to the request. To that end, a cloud computing, distributed computing, or client-server computing technology may be used, for example.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 540) including one or more instructions that are stored in a storage medium (e.g., internal memory 536 or external memory 538) that is readable by a machine (e.g., the electronic device 501). For example, a processor (e.g., the processor 520) of the machine (e.g., the electronic device 501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory storage medium" means a tangible device, and does not include a signal (e.g., an electromagnetic wave), but this term does not differentiate between where data is semi-permanently stored in the storage medium and where the data is temporarily stored in the storage medium. For example, "the non-transitory storage medium" may include a buffer where data is temporally stored.

According to an embodiment, a method according to certain embodiments of the disclosure may be included and provided in a computer program product. The computer program product may be traded as a product between a seller and a buyer. The computer program product (e.g., downloadable app)) may be distributed in the form of a machine-readable storage medium (e.g., compact disc read only memory (CD-ROM)), or be distributed (e.g., downloaded or uploaded) online via an application store (e.g., PlayStore™) or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to the embodiments of the disclosure, the electronic device may use an effective display area based on the number of holes formed in the display.

Furthermore, the electronic device may increase the transmittance of a signal (or light) emitted from a sensor and/or the signal (or light) received by the sensor.

Moreover, the electronic device may interrupt infiltration of dust through a hole formed in the electronic device.

In addition, the disclosure may provide various effects that are directly or indirectly recognized.

While the disclosure has been shown and described with reference to certain embodiments thereof, it will be understood by those skilled in the art that various changes in form and details may be made therein without departing from the disclosure as defined by the appended claims and their equivalents.

What is claimed is:

1. An electronic device, comprising:
a sensor structure;
a printed circuit board on which the sensor structure is disposed;
a first support member including a first surface and a second surface opposite to the first surface, the first support member defining a first hole formed through the first surface and the second surface, wherein the printed circuit board is coupled to the second surface; and
a display coupled to the first surface of the first support member, the display defining:
a second hole formed in the display to correspond to a portion of the first hole, and
a third hole formed in the display, the third hole adjacent to the second hole and corresponding to another portion of the first hole,
wherein signal lines related to driving pixels of the display are disposed in an area between the second hole and the third hole,
wherein at least a partial area of the display is set as an active area configured to display a screen,
wherein the sensor structure is at least partially located in the second hole formed in the display and the third hole formed in the display,
wherein the sensor structure includes a sensor, a first camera and a second camera,
wherein the first camera is disposed proximate to the second camera, and at least a portion of the sensor is interposed between the first and second cameras,
wherein the first camera passes through one side of the first hole and is disposed in the second hole, and
wherein the second camera passes through an opposite side of the first hole and is disposed in the third hole.

2. The electronic device of claim 1, wherein the sensor is disposed under the display.

3. The electronic device of claim 1, wherein the signal lines are separated from one another at regular intervals, and wherein the sensor is disposed between the signal lines within the regular intervals.

4. The electronic device of claim 1, wherein another area of the display different from the partial area is set as an inactive area, the inactive area set at least between the second hole and the third hole.

5. The electronic device of claim 4, wherein the inactive area of the display is configured to include a light transmittance rate greater than a light transmittance rate of the active area of the display by a prespecified light transmittance magnitude.

6. The electronic device of claim 4, wherein at least one of a light emitting part of the sensor and a light receiving part of the sensor is disposed under the inactive area.

7. The electronic device of claim 1, wherein the first hole further defines an extension recess corresponding to a position of the sensor.

8. The electronic device of claim 1, wherein the second camera further includes a transmitter and a receiver, and
wherein at least a part of the transmitter and the receiver is disposed within the third hole.

9. The electronic device of claim 1, further comprising:
a block structure into which at least a portion of the sensor structure is inserted.

10. The electronic device of claim 9, wherein the block structure passes through the first hole, such that the first camera and the second camera are disposed in the second hole and the third hole.

11. The electronic device of claim 9, wherein the block structure defines at least one through-hole into which at least one of the first camera, the second camera, and the sensor is inserted.

12. The electronic device of claim 11, wherein the block structure includes an adhesive member coupled to a front surface of the block structure and surrounding at least a portion of the at least one through-hole, wherein the front surface of the block structure corresponds to the first surface of the first support member.

13. The electronic device of claim 12, wherein the at least one through-hole defines a first through-hole, a second through-hole, and a third through-hole,
wherein the adhesive member is attached to a rear surface of the display while surrounding at least a part of the second through-hole and the third through-hole, and
wherein the rear surface of the display corresponds to the second surface of the first support member.

14. The electronic device of claim 1, further comprising:
a front plate coupled to a front surface of the display, the front plate covering at least the first camera, the second camera, and the sensor.

15. An electronic device, comprising:
a housing including a front plate facing a first direction, a back plate facing a second direction opposite to the first direction, and a side member surrounding a space defined between the front plate and the back plate;
a display visible through at least a portion of the front plate, the display including a first edge of a first length, a second edge of a second length greater than the first length, a third edge parallel to the first edge, and a fourth edge parallel to the second edge, wherein the display includes:
a plurality of data lines extending between the first edge and the third edge so as to be substantially parallel to the second edge,
a first opening formed in the display adjacent to the first edge, and
a second opening formed in the display to be spaced apart from the first edge, the second opening aligned with the first opening so as to be substantially parallel to the first edge, and
wherein a first set of data lines from among the plurality of data lines are disposed in a first area between the first opening and the second opening;
a support member disposed between the display and the back plate;
at least one image sensor coupled to the support member, at least partially located in the first opening formed in the display and directed in the first direction through the first opening; and
at least one second image or optical sensor coupled to the support member, at least partially located in the second opening formed in the display and directed in the first direction through the second opening, and
wherein the support member defines a third opening, and the display defines the first opening defined on a first side of the display and the second opening defined on a second side of the display opposite the first side,
wherein the electronic device further comprises an adhesive member attached to a rear surface of the display, the adhesive member surrounding at least part of the first opening and the second opening, and
wherein the rear surface of the display is disposed adjacent to a second surface of the support member.

16. The electronic device of claim 15, wherein the image sensor supports at least one of a function of a front camera and a function of a time-of-flight (ToF) camera.

17. The electronic device of claim 15, wherein when viewed from above the display, a second set of data lines from among the plurality of data lines are disposed in a second area between the first opening and the fourth edge,
wherein the first set of data lines and the second set of data lines are disposed at regular intervals, and
wherein the intervals of the second set of data lines in the second area are narrower than the intervals of the first set of data lines as disposed in the first area.

18. The electronic device of claim 15, wherein when viewed from above the display, a third set of data lines from among the plurality of data lines is disposed in a third area between the second opening and the second edge, and
wherein the third set of data lines is disposed at regular intervals, and
wherein the intervals of the third set of data lines in the third area are narrower than the intervals of the first set of data lines as disposed in the first area.

* * * * *